US012592618B2

(12) United States Patent
Ruppert

(10) Patent No.: US 12,592,618 B2
(45) Date of Patent: Mar. 31, 2026

(54) EXTERNALLY EXCITED ELECTRIC MACHINE, MOTOR VEHICLE, AND METHOD FOR PRODUCING AN EXTERNALLY EXCITED ELECTRIC MACHINE

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 459 days.

(21) Appl. No.: 18/355,263

(22) Filed: Jul. 19, 2023

(65) Prior Publication Data

US 2024/0030786 A1    Jan. 25, 2024

(30) Foreign Application Priority Data

Jul. 20, 2022    (DE) ......................... 102022118104.9

(51) Int. Cl.
*H02K 11/33*        (2016.01)
*H02K 3/38*         (2006.01)

(52) U.S. Cl.
CPC ............... *H02K 11/33* (2016.01); *H02K 3/38* (2013.01); *H02K 2203/03* (2013.01)

(58) Field of Classification Search
CPC ........ H02K 11/30; H02K 11/33; H02K 5/225; H02K 3/38; H02K 2203/03; H02K 2211/03; H02K 9/227
USPC .................................................. 310/68 R, 71
See application file for complete search history.

(56) References Cited

U.S. PATENT DOCUMENTS

| 5,966,291 | A | 10/1999 | Bäumel et al. |
| 2016/0211727 | A1 | 7/2016 | Maier |
| 2021/0092882 | A1* | 3/2021 | Ruppert ............. H05K 7/14322 |

FOREIGN PATENT DOCUMENTS

| CN | 203027181 | U | 6/2013 |
| CN | 203327350 | U | 12/2013 |
| DE | 19645636 | C1 | 3/1998 |
| DE | 102015200866 | A1 | 7/2016 |

(Continued)

OTHER PUBLICATIONS

Apelsmeier et al., Electrical Circuit Arrangement Comprising an Excitation Circuit and an Inverter Circuit and a Motor Vehicle, Jun. 2, 2021, DE 102019132685 (English Machine Translation) (Year: 2021).*

*Primary Examiner* — Alexander A Singh
(74) *Attorney, Agent, or Firm* — Seed Intellectual Property Law Group LLP

(57)        ABSTRACT

An externally excited electric machine includes an exciter power circuit connected to a rotor winding, a stator power circuit connected to a stator winding, an exciter control circuit connected by at least a first connector to the exciter power circuit, and a stator control circuit connected by at least a second connector to the stator power circuit. The exciter control circuit and the stator control circuit are mounted on a common circuit board. The first connector is connected to a first electrical contact of the exciter power circuit, and the second connector is connected to a second electrical contact of the stator power circuit. The first electrical contact and the second electrical contact are at different heights in relation to the circuit board. The first or the second connector has a geometrical form that bridges over a height difference between the first electrical contact and the second electrical contact.

17 Claims, 3 Drawing Sheets

(56)  References Cited

FOREIGN PATENT DOCUMENTS

| DE | 102019128721 A1 | 4/2021 | |
| DE | 102019132685 A1 * | 6/2021 | .............. B60L 50/60 |
| DE | 102021213996 A1 | 6/2022 | |
| WO | 202227744 A1 | 2/2022 | |

* cited by examiner

EXTERNALLY EXCITED ELECTRIC MACHINE, MOTOR VEHICLE, AND METHOD FOR PRODUCING AN EXTERNALLY EXCITED ELECTRIC MACHINE

BACKGROUND

Technical Field

The present disclosure relates to an externally excited electric machine, comprising an exciter power module electrically connected to at least one rotor winding, a stator power module electrically connected to at least one stator winding, an exciter control circuit, which is electrically connected by at least a first connector to the exciter power module, and a stator control circuit, which is electrically connected by at least a second connector to the stator power module.

Description of the Related Art

Electric machines are being used increasingly as drive machines in motor vehicles. Permanently excited electric machines, especially synchronous machines, are used predominantly as the main drive unit. However, externally excited electric machines are also gaining in increasing importance, since magnets containing rare earth elements are typically used for permanently excited synchronous machines and hence they are relatively costly, for example, when a high field strength is demanded.

In the case of externally excited electric machines, it is necessary to provide an exciter current in the exciter or rotor windings for their operation. The rotor winding therefore serves for generating a magnetic exciter field, for which it needs to be energized. For this purpose, the exciter power module is provided, being electrically connected to an exciter control circuit for providing the control signals.

While the rotor winding is arranged on a rotor of the electric machine, a stator of the electric machine comprises corresponding stator windings, which interact with the magnetic field generated on the part of the rotor windings for the operation of the electric machine. The stator windings are likewise connected to a corresponding stator power module, which can be actuated accordingly by a stator control circuit. Electric machines with control circuits are known, for example, from CN 2 03 027 181 U or WO 2022/027 744 A1.

BRIEF SUMMARY

Embodiments of the disclosure provide an improved concept with regard to an externally excited electric machine, especially with regard to a simplified design and manufacture possibility.

Embodiments of the disclosure provide an externally excited electric machine of the aforementioned kind, in that the exciter control circuit and the stator control circuit are mounted on a common circuit board, wherein the first connector is electrically contacted with a first electrical contact of the exciter power module and the second connector with a second electrical contact of the stator power module, wherein the first electrical contact and the second electrical contact are situated at different heights in relation to the circuit board, wherein the first connector and/or the second connector can be adapted in their geometrical form so that the height difference between the electrical contact can be bridged over.

The externally excited electric machine according to the disclosure is especially preferably an externally excited synchronous machine. The externally excited electric machine is preferably a drive motor for a motor vehicle. The electric machine can comprise a rotor having at least one rotor winding functioning as an exciter winding, the rotor being mounted rotatably in a housing of the electric machine. Moreover, the electric machine can comprise a stator fixed in the housing and having at least one stator winding, which interacts with the magnetic field generated by the rotor winding for the operation of the electric machine.

Thus, the electric machine can be operated in a drive mode, during which electric energy stored in a traction battery of the motor vehicle is converted into kinetic energy by way of the electric machine and transferred across a drive train to the wheels, especially the front and/or rear wheels of the motor vehicle. In a generator operation of the electric machine, the kinetic energy of the motor vehicle is converted by way of the electric machine into electric energy, which can be stored in the traction battery or used for other purposes. In this way, a deceleration or braking torque of motor vehicle can be brought about.

For the operation of the electric machine, it is necessary to generate an alternating voltage. This is done typically by way of the exciter power module, which is hooked up between the stator winding and the traction battery, the electrical contacting for the connection of the exciter power module to the rotor winding being realized for example by at least one slip contact, comprising at least one slip ring and at least one brush. The exciter power module is adapted to transform the electric DC voltage present on the side with the traction battery into an electric alternating voltage and vice versa. Hence, the exciter power module can also be called a rectifier or an inverter and it is electrically connected to the exciter control circuit for actuating purposes. Accordingly, the stator winding is also connected to the stator power module, which is electrically contacted to the stator control circuit. The electric machine can be three-phase, so that each time stator control circuits can be provided which are associated with one of the phases U, V, W.

One of the central ideas of the disclosure is that the exciter control circuit and the stator control circuit are arranged on a common board or circuit board. In particular, as compared to the case when separate circuit boards are provided for the control circuits, this has the advantage of reducing the material costs and the manufacturing expense, especially since two circuit boards do not need to be separately secured, especially by way of screws. In connection with the common circuit board and the fact that the power modules are typically different in their construction, especially having different thicknesses, the basic problem occurs that the electrical contact of the power modules, by which the electrical connection to the respective control circuit is formed, are situated at different height levels. That is, the distance between the circuit board and the first electrical contact is different than the distance between the circuit board and the second electrical contact. Furthermore, the power modules are often different in regard to the electrical contacts themselves, which are often provided as contacting or terminal pins having different dimensions. Therefore, it is basically not possible to attach a flat circuit board to both the first and the second electrical contact without further ado. Instead, separate circuit boards are often used for the exciter control circuit and the stator control circuit.

In order to still arrange the control circuits on the common circuit board, however, it is proposed according to the disclosure that at least one of the connectors by which the electrical contacting is formed between the power module and the respective control circuit is configured such that the height difference between the electrical contact can be bridged over. Specifically, at least one of the connectors or a length of this connector is not rigidly dictated or fixed, but instead is geometrically such as can be changed or deformed, especially elastically, so that two contacting sites can be connected by it, which may have a certain distance between each other. The value of the distance need not be fixed in this case, but rather it can be any given value in a distance range.

Especially preferably, it is provided in the externally excited electric machine according to the disclosure that the first connector and/or the second connector is at least one bonding wire and/or at least one bonding band or comprises at least one bonding wire and/or at least one bonding band. The bonding wire or the bonding band preferably consists of a metal, such as copper. The bonding wire or the bonding band can be at least partly U-shaped in regard to its longitudinal extension, and in particular the outer ends of the U-shape can be electrically connected to the contacting sites being contacted. The bonding wire and/or the bonding band can run or be led laterally on the circuit board down to the respective electrical contact.

According to the disclosure, it can be provided that the first connector configured as the bonding wire and/or the bonding band can be electrically connected on the one hand to an electrically conductive contacting surface of the exciter power module and on the other hand to an electrically conductive contacting surface of the exciter control circuit. In addition or alternatively, the second connector configured as the bonding wire and/or the bonding band can be electrically connected on the one hand to an electrically conductive contacting surface of the stator power module and on the other hand to an electrically conductive contacting surface of the stator control circuit. In this embodiment, one of the electrical contacts is the corresponding contacting surface. The contacting surface, such as a rectangular one, can be or comprise an electrically conductive surface of a metal such as copper. The contacting surface can therefore also be called a contacting or copper pad. The contacting surface of the respective power module can be arranged on the outside of a housing of the power module. The contacting surface of the respective control circuit can be a component secured on the common circuit board, for example soldered.

The electrical connection between the bonding wire and/or the bonding band and the contacting surface can be formed by a welding, especially by a laser welding. Alternatively, a solder connection is conceivable.

In one advantageous embodiment of the externally excited electric machine according to the disclosure it is provided that the first electrical contact or the second electrical contact is or comprises at least one contacting pin, especially a press-fit pin, of the exciter power module and/or the stator power module. The corresponding connector in this embodiment is a metallized hole of the circuit board. Thus, in particular, it is conceivable that the contacting pin produces not only an electrical connection between the respective power module and the respective control circuit, but also that a mechanical fastening of the common circuit board to the respective power module is realized in this way. Preferably, multiple contacting or press-fit pins are provided as the electrical contact.

Especially preferably, at least one control circuit connector is provided, by which the exciter control circuit and the stator control circuit are electrically connected to each other for the transmission of control signals and/or voltages and/or measurement signals, especially regarding a preferably sensor-detected temperature of at least one of the windings. In particular, since the control circuits are arranged on the common circuit board, the control circuit connector can be a component, especially a conductor track, of the circuit board and/or a connection wire arranged on the circuit board, especially a soldered connection wire. In this embodiment, no cost-intensive plug connections are required for the transmission of the corresponding signals or electric currents/voltages.

The exciter power module and/or the stator power module can be arranged on a housing of the externally excited electric machine or on a cooling device for cooling a component of the electric machine. Thus, in particular, the exciter power module and/or the stator power module, especially also further components of the electric machine, can be cooled by way of the cooling device. The power modules can be secured to the cooling device for example by way of a glue or screw connection.

According to one possible modification of this embodiment, it can be provided that the stator power module is situated at a central region of the cooling device and the exciter power module, arranged adjacent to the stator power module, is situated at a lateral region of the cooling device. The common circuit board can be attached by the contacting pins to the stator power module, the bonding wire or the bonding band being led down to the exciter control circuit laterally from the stator control circuit or the circuit board.

The present disclosure moreover relates to a motor vehicle, comprising at least one externally excited electric machine according to the preceding specification. All of the benefits and features explained in regard to the externally excited electric machine according to the disclosure can be applied equally to the motor vehicle according to the disclosure and vice versa.

The present disclosure moreover relates to a method for producing an externally excited electric machine, comprising an exciter power module electrically connected to at least one rotor winding, a stator power module electrically connected to at least one stator winding, an exciter control circuit, which is electrically connected by at least a first connector to the exciter power module, and a stator control circuit, which is electrically connected by at least a second connector to the stator power module. In this method, it is proposed according to the disclosure that the exciter control circuit and the stator control circuit are mounted on a common circuit board, wherein the first connector is electrically contacted with a first electrical contact of the exciter power module and the second connector with a second electrical contact of the stator power module, wherein the first electrical contact and the second electrical contact are situated at different heights in relation to the circuit board, wherein the first connector and/or the second connector is adapted in its geometrical form so that the height difference between the electrical contact is bridged over. All of the benefits and features explained in regard to the externally excited electric machine according to the disclosure and the motor vehicle according to the disclosure can be applied equally to the method according to the disclosure and vice versa.

In the method according to the disclosure, it is especially preferably proposed that the stator control circuit is connected to the second electrical contact, which is or comprises at least one contacting pin, especially a press-fit pin, of the stator power module, and then the exciter control circuit and the exciter power module is connected to the first connector by which the height difference between the electrical contact is bridged over and which is at least one bonding wire and/or at least one bonding band or comprises at least one bonding wire and/or at least one bonding band. In this embodiment, at first the stator control circuit is electrically attached by way of the contacting pin to the stator power module. Insofar as the press-fit pins are provided as the contacting pin, there will take place at the same time a fastening of the common circuit board to the stator power module, during which multiple contacting or press-fit pins are provided as second electrical contact. After this comes the electrical connection of the exciter control circuit to the exciter power module by the bonding wire or the bonding band.

Preferably, the electrical connection between the bonding wire and/or the bonding band with a contacting surface of the exciter control circuit and with a contacting surface of the exciter power module is formed by a welding, especially by a laser welding.

BRIEF DESCRIPTION OF THE SEVERAL VIEWS OF THE DRAWINGS

Further benefits, features and details of the present disclosure will emerge from the following explained exemplary embodiments as well as the figures.

DETAILED DESCRIPTION

Figure 1:
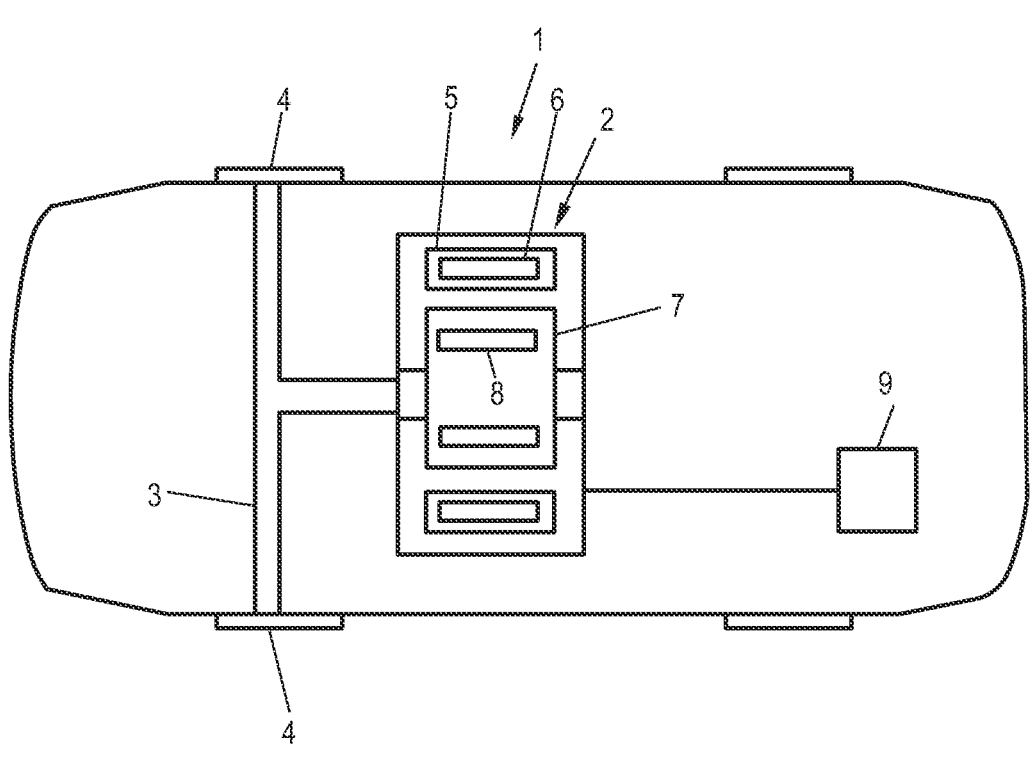
FIG. 1 shows a schematic representation of a motor vehicle according to one exemplary embodiment of the disclosure, comprising an externally excited electric machine according to one exemplary embodiment of the present disclosure.

FIG. 1 shows a schematic view of a motor vehicle 1 according to the disclosure in an exemplary embodiment, comprising an electric machine 2 configured as an externally excited synchronous machine, which is connected across an extremely schematically indicated drive train 3 to wheels 4 of the motor vehicle 1. The drive train 3 comprises not otherwise shown shafts and differentials, by which a torque can be transferred from the electric machine 2 to the wheels 4 and vice versa. The motor vehicle 1 in the present example is a front-wheel drive unit.

The three-phase electric machine 2, for example, comprises a stator 5 having multiple stator windings 6 and a rotor 7 having multiple rotor windings 8. The electric machine 2 can be operated in a drive mode, in which it converts electric energy of a traction battery 9 into kinetic energy, transferring a corresponding drive torque across the drive train 3 to the wheels 4. The electric machine 2 can be operated furthermore in a recuperation mode, in which kinetic energy from the motor vehicle 1 is transformed by way of the electric machine 2 into electric energy, which is stored for example in the traction battery 9 or can be used for other purposes.

Figure 2:
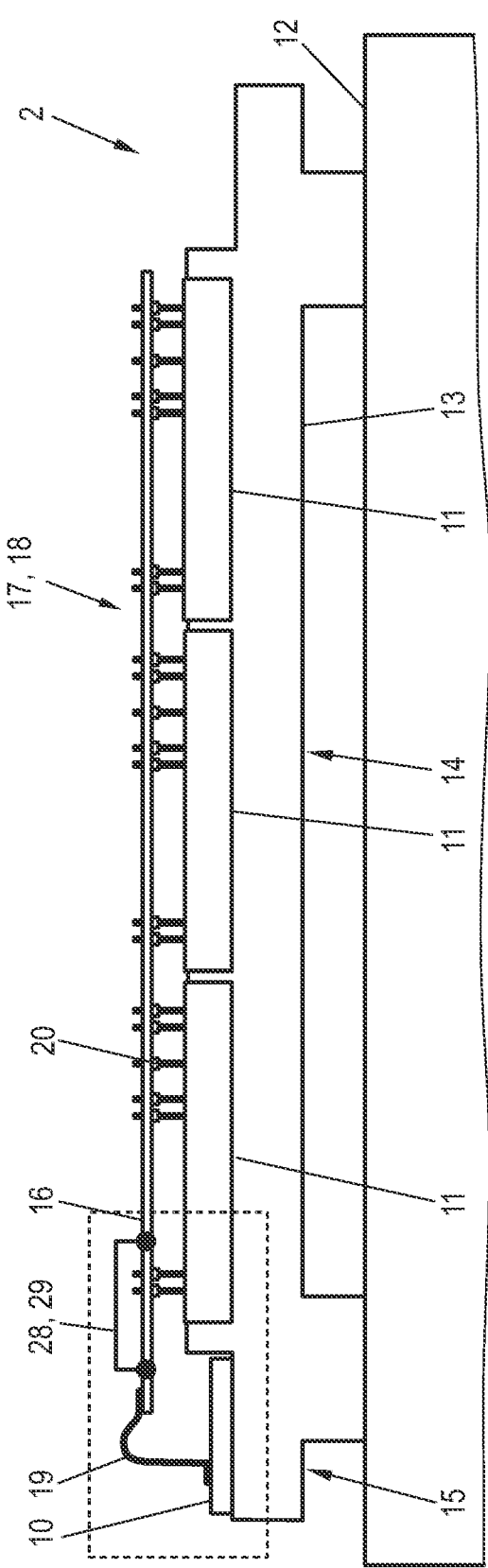
FIG. 2 shows a view of one segment of the electric machine of the motor vehicles of FIG. 1.

FIG. 2 shows details of the electric machine 2. Thus, it comprises moreover an exciter power module or circuit 10 as well as three stator power modules or circuits 11. The power modules 10, 11 are arranged on a cooling device 13, fastened to a housing 12 of the electric machine 2, and are secured to it. The cooling device 13 has a cooling agent flowing through it and therefore serves for the cooling of the power modules 10, 11 and possibly other components of the electric machine 2. The power modules 10, 11 are for example glued or screwed to the cooling device 13. The stator power modules 11 are arranged on a central region 14 and the exciter power module 10, situated adjacent to it, on a lateral region 15 of the cooling device 13.

The exciter power module 10 is electrically connected to the rotor windings 8 and the stator power module 11 to the stator windings 6, the electrical connections not being otherwise shown in the figures. Slip contacts, likewise not otherwise shown, are provided for the connection of the exciter power module 10 to the rotor windings 8.

As can be seen from FIG. 2, the electric machine 2 comprises a common circuit board 16, on which an exciter control circuit 17 and a stator control circuit 18 is arranged. Details regarding the control circuits 17, 18 are not shown in the figures. The exciter control circuit 17 is electrically connected to the exciter power module 10 by a first connector 19. The stator control circuit 18 is electrically connected to the stator power module 11 by a second connector 20. The control circuits 17, 18 serve for actuating the power modules 10, 11 and they comprise corresponding semiconductor components for this purpose, which are soldered onto the circuit board 16.

In the following, details shall be explained regarding the connector 19, 20 with the aid of FIG. 3, which shows an enlarged section of the electric machine 2 indicated by the dashed-line box in FIG. 2.

In order to realize the electrical connection between the exciter power module 10 and the exciter control circuit 17, the first connector 19 is contacted with a first electrical contact 21 of the exciter power module 10. The first connector 19 is configured as a bonding band 22 and the first electrical contact 21 as a contacting surface 23. The circuit board 16 likewise has a contacting surface 27 for the attachment of the bonding band 22 to the circuit board 16 or the exciter control circuit 17. The bonding band 22 is attached or fastened to the contacting surfaces 23, 27 each time by a welding.

In order to realize the electrical connection between the stator power module 11 and the stator control circuit 18, the second connector 20 is contacted with a second electrical contact 24 of the stator power module 11. Specifically, multiple second electrical contacts 24 are provided, each of them being a contacting pin 25, namely, a press-fit pin. The second connector 20 are metallized holes 26 of the circuit board 16, in which the contacting pins 25 are introduced to form a press-fit connection.

Figure 4:
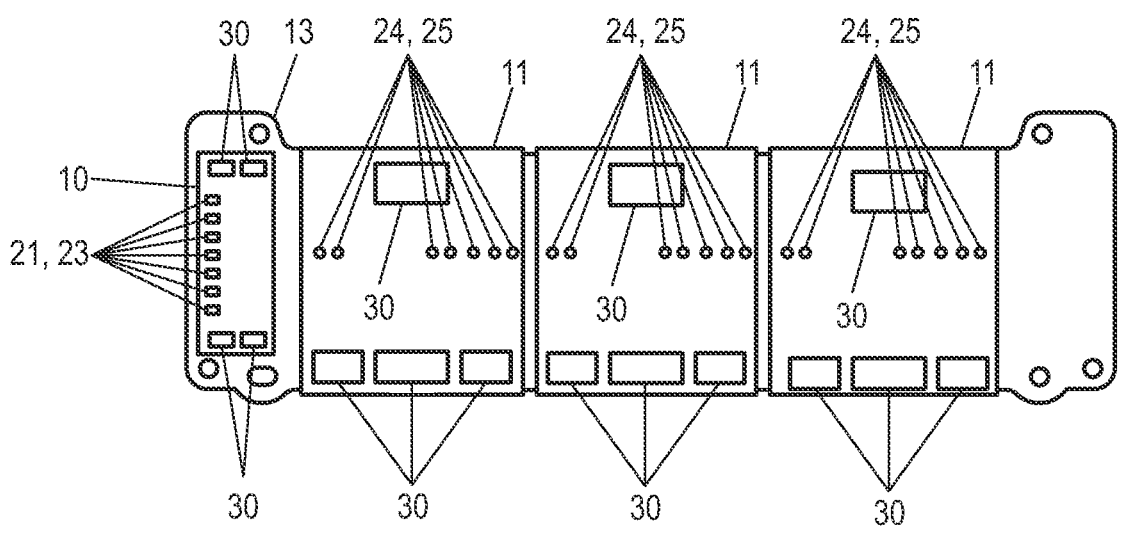
FIG. 4 shows a view of a cooling device of the electric machine of FIG. 2 with circuit board not placed thereon.

The just described components to form the electrical contacting are illustrated in particular with the aid of FIG. 4, which shows a view of the cooling device 13, where the circuit board 16 has been left out. The power modules 10, 11 furthermore have other contacting surfaces 30, by which the electrical connections between the power modules 10, 11 and the windings 6, 8 can be produced, especially making use of further bonding wires or bonding bands, not otherwise shown.

Figure 3:
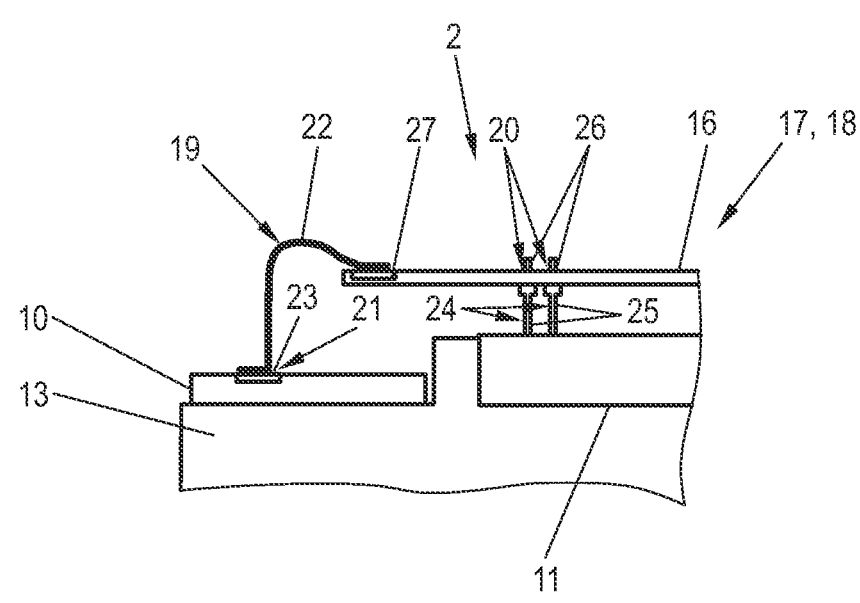
FIG. 3 shows an enlarged partial view of FIG. 2 regarding the electric machine.

Referring to FIG. 3, it becomes evident that the electrical contacts 21, 24 are arranged at different heights with regard to the circuit board 16, due to the different dimensions, especially the thicknesses, of the power modules 10, 11. Although it would be required on account of this fact to provide separate circuit boards for the exciter control circuit 17 and the stator control circuit 18, the use of the first connector 19 configured as the bonding band 22 makes it possible to bridge over this height difference. Thus, the first connector 19 or the bonding band 22 is geometrically deformable, so that different distances can be bridged over between the circuit board 16 and the first electrical contact 21. This is not the case for the second connector 24 or the contacting pins 25.

In the exemplary embodiment shown, both the electrical connection between the stator control circuit 18 and the stator power modules 11 and the mechanical attachment of the control circuits 17, 18 or the circuit board 16 to the stator power modules 11 is realized by way of the second connector 24. Hence, only the corresponding electrical connection can be formed by the first connector 19, but not a mechanically stable attachment of the circuit board 16.

Instead of the first connector 19 provided as the bonding band 22, a bonding wire can be provided. Furthermore, it is conceivable for the exciter control circuit 10 to be contacted by contacting pins and the stator control circuit 11 by bonding bands or wires.

For the transmission of control signals, voltages, and measurement signals, especially regarding a temperature of the windings 6, 8, there is provided a control circuit connector 28, shown only extremely schematically in FIG. 2, by which the exciter control circuit 17 and the stator control circuit 18 are connected to each other. The control circuit connector 28 is a component of the circuit board 16, namely, a conductor track 29. Alternatively, the control circuit connector 28 can be a connection wire arranged on the circuit board 16, in particular soldered thereon.

In the following, with the aid of the just explained exemplary embodiments of the electric machine 2 according to the disclosure, an exemplary embodiment shall be described for a method according to the disclosure for producing the electric machine 2. First of all, the exciter control circuit 17 and the stator control circuit 18 are arranged on the common circuit board 16. This is done by soldering corresponding semiconductor components on the circuit board 16. Furthermore, the power modules 10, 11 are screwed onto the cooling device 13. This, in turn, is fastened to the housing 12 of the electric machine 2, for example likewise by way of a screw connection.

In the next step, the circuit board 16 is pressed onto the contacting pins 25, so that these reach through the holes 26. In this way, on the one hand, an electrical connection is realized between the stator control circuit 18 and the stator power module 11 and, on the other hand, a mechanical connection is realized between the circuit board 16 and the stator power module 11.

In the next step, the bonding bands 22 are attached to the contacting surfaces 21, 27 by way of laser welding, thereby producing the electrical connection between the exciter control circuit 17 and the exciter power module 11.

German patent application no. 102022118104.9, filed Jul. 20, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An externally excited electric machine, comprising:
an exciter power circuit electrically connected to at least one rotor winding;
a stator power circuit electrically connected to at least one stator winding;

an exciter control circuit electrically connected by at least a first connector to the exciter power circuit; and
a stator control circuit electrically connected by at least a second connector to the stator power circuit,
wherein the exciter control circuit and the stator control circuit are mounted on a common circuit board,
wherein the first connector is electrically connected to a first electrical contact of the exciter power circuit,
wherein the second connector is electrically connected to a second electrical contact of the stator power circuit,
wherein the first electrical contact and the second electrical contact are situated at different heights in relation to the circuit board, and
wherein the first connector or the second connector has a geometrical form that bridges over a height difference between the first electrical contact and the second electrical contact.

2. The externally excited electric machine according to claim 1, wherein the first connector or the second connector includes a bonding wire or a bonding band.

3. The externally excited electric machine according to claim 2, wherein the first connector includes the bonding wire or the bonding band and is electrically connected to an electrically conductive contacting surface of the exciter power circuit and an electrically conductive contacting surface of the exciter control circuit, or the second connector includes the bonding wire or the bonding band and is electrically connected to an electrically conductive contacting surface of the stator power circuit and an electrically conductive contacting surface of the stator control circuit.

4. The externally excited electric machine according to claim 3, wherein an electrical connection between the bonding wire or the bonding band and the contacting surface is formed by welding.

5. The externally excited electric machine according to claim 4, wherein the electrical connection between the bonding wire or the bonding band and the contacting surface if formed by laser welding.

6. The externally excited electric machine according to claim 1, wherein the first electrical contact or the second electrical contact includes a contacting pin of the exciter power circuit or the stator power circuit.

7. The externally excited electric machine according to claim 1, wherein at least one control circuit connector is provided, by which the exciter control circuit and the stator control circuit are electrically connected to each other and, in operation, transmit control signals, voltages, or measurement signals.

8. The externally excited electric machine according to claim 7, wherein the at least one control circuit connector is a component of the circuit board or a connection wire arranged on the circuit board.

9. The externally excited electric machine according to claim 8, wherein the component is a conductor track.

10. The externally excited electric machine according to claim 1, wherein the exciter power circuit or the stator power circuit is arranged on a housing of the externally excited electric machine or on a cooling device that, in operation, cools a component of the electric machine.

11. The externally excited electric machine according to claim 10, wherein the exciter power circuit and the stator power circuit are on the cooling device, wherein the stator power circuit is situated at a central region of the cooling device, and wherein the exciter power circuit is situated adjacent to the stator power circuit at a lateral region of the cooling device.

12. A motor vehicle, comprising at least one externally excited electric machine according to claim 1.

13. A method for producing an externally excited electric machine, the method comprising:

electrically connecting an exciter power circuit to at least one rotor winding;

electrically connecting a stator power circuit to at least one stator winding;

electrically connecting an exciter control circuit by at least a first connector to the exciter power circuit;

electrically connecting a stator control circuit by at least a second connector to the stator power circuit;

mounting the exciter control circuit and the stator control circuit on a common circuit board;

electrically connecting the first connector to a first electrical contact of the exciter power circuit; and electrically connecting the second connector to a second electrical contact of the stator power circuit, wherein the first electrical contact and the second electrical contact are situated at different heights in relation to the circuit board, and wherein the first connector or the second connector has a geometrical form that bridges over a height difference between the first electrical contact and the second electrical contact.

14. The method according to claim 13, further comprising:

connecting the stator control circuit to the second electrical contact, wherein the second electrical contact includes a contacting pin of the stator power circuit; and connecting the exciter control circuit and the exciter power circuit to the first connector, wherein the first electrical contact or the second electrical contact includes a bonding wire or a bonding band.

15. The method according to claim 14, wherein the contacting pin is a press-fit pin.

16. The method according to claim 14, further comprising:

welding an electrical connection between the bonding wire or the bonding band with a contacting surface of the exciter control circuit and with a contacting surface of the exciter power circuit.

17. The according to claim 16, wherein the welding includes laser welding.

* * * * *